Aug. 24, 1965   F. LE TARTE   3,202,245
WINDOW AND DOOR FRAME CONSTRUCTION
Filed Nov. 30, 1962
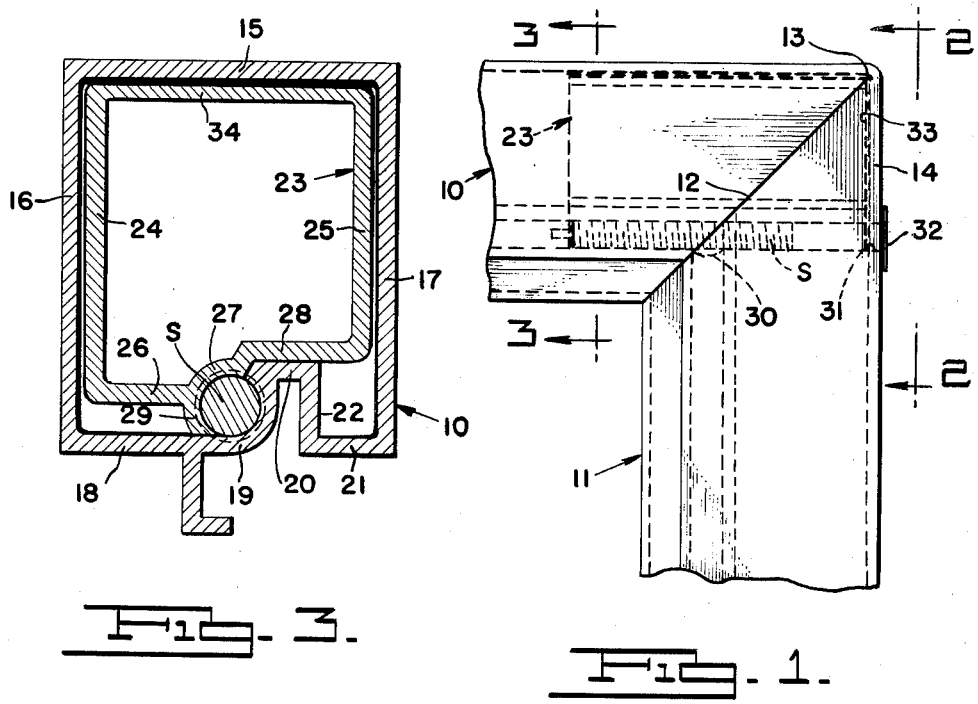
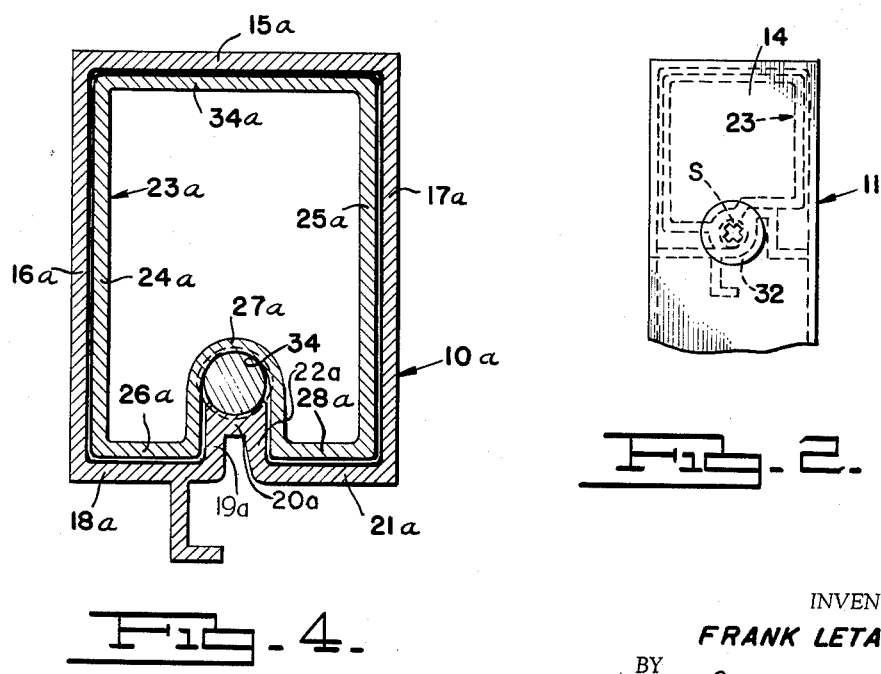
INVENTOR.
FRANK LETARTE
BY
ATTORNEYS

3,202,245
WINDOW AND DOOR FRAME CONSTRUCTION
Frank Le Tarte, Wales Township, St. Clair County, Mich., assignor to Le Tarte Enterprises, Smith Creek, Mich., a co-partnership
Filed Nov. 30, 1962, Ser. No. 241,194
7 Claims. (Cl. 189—36)

This invention relates to improvements in metal frame constructions, and more particularly, to a new and useful improved corner frame construction for window frames, door frames or the like.

Patent No. 2,736,403 discloses a corner joint construction for window and door frames which comprises an extruded metal member having the spaced parallel connector-engaging flanges projecting from a surface thereof and adapted to receive therebetween the shank of a threaded connector. A disadvantage of this prior art corner joint structure is that the connector-engaging flanges extend longitudinally of the frame members for the entire lengths thereof but only a portion thereof adjacent the corner joint is used. A further disadvantage of this prior art corner joint structure is that the threaded connector is only engaged on three sides thereof by the mating connector-engaging flanges and the extruded metal member.

Accordingly it is the primary object of the present invention to provide a novel and improved corner construction for metallic window frames and door frames, or the like, which includes a pair of mitered corner elements secured together in angular relationship by means of a gusset slidably mounted in a first one of said corner elements, and a fastener means extended through a second one of said corner elements and into fastening engagement with both said first one of said corner elements and said gusset to thereby secure said corner elements in said angular relationship.

It is another object of the present invention to provide a corner frame construction for use in window frames, door frames or the like and which are made from extruded metal, such as aluminum, and wherein the corners of such frames are joined to form a rigid structure which will retain a desired angular form and which will not warp out of a single plane.

It is a further object of the present invention to provide a novel and improved corner frame construction which includes a threaded connector means for connecting the corner elements together but which is more economical than the prior art threaded corner joint constructions because of the provision of a gusset provided with a corner wall portion for engagement by said connector means simultaneously when the threaded connector means engages a similar corner wall portion on one of the corner elements thereby eliminating the connector-engaging flanges in the aforementioned prior art corner joint structure which runs for the entire length of the frame portions.

Other objects, features and advantages of this invention will be apparent from the following detailed description and appended claims, reference being had to the accompanying drawing forming a part of the specification wherein like reference numerals designate corresponding parts of the several views.

In the drawing:

FIG. 1 is a fragmentary elevational view of a frame corner construction embodying the principles of the invention;

FIG. 2 is a fragmentary elevational view of the structure illustrated in FIG. 1 taken along the line 2—2 and looking in the direction of the arrows;

FIG. 3 is an enlarged sectional view of the structure illustrated in FIG. 1 taken along the line 3—3 thereof and looking in the direction of the arrows; and FIG. 4 is an elevational sectional view similar to FIG. 3 and showing a second embodiment of the invention.

Referring now to the drawing, and in particular to FIGS. 1, 2 and 3, the numerals 10 and 11 generally indicate the corner elements of a corner construction for a window frame or a door frame. The corner elements 10 and 11 are joined along the mitered line 12. In the illustrative structure of FIG. 1, the corner elements 10 and 11 have been formed from a continuous, extruded hollow rectilinear workpiece. The workpiece may be notched by any suitable method without cutting the back wall 14 and then the workpiece is bent about the point 13 to bring the corner elements 10 and 11 into abutting engagement along the joint line 12. One suitable method for notching a metal strip to form the mitered joint without cutting the back wall 14 is disclosed in my co-pending United States application, Serial Number 6,336 filed on January 14, 1960, now Patent No. 3,097,684 patented July 16, 1963, and entitled Frame Construction. In my patented method of frame construction, a hollow metal strip is notched with a V-shaped notch having an angle approximately ninety degrees at the apex to form a pair of corner members, one on each side of the notch. It will be obvious that the corner construction of the present invention can also be employed in corner constructions wherein the frame elements are formed separately and joined along a similar mitered joint line as 12.

As shown in FIG. 3, the corner element 10 has a closed shape or tubular cross section including the outer wall 15, the integrally spaced apart side walls 16 and 17 and the irregularly shaped front wall indicated by the numerals 18, 19, 20, 21 and 22. The inner wall portion 19 is curved or arcuately formed to provide a portion of an elongated screw channel for self threading engagement with a screw or threaded connector S. The corner element 11 is provided with a similar cross sectional shape. It is known in the art to employ, in a hollow frame workpiece of this type, an elongated, inwardly projecting wall portion having a generally U-shaped cross section such as that defined by wall portions 19, 20 and 22. One example of this type of workpiece is disclosed in the above-mentioned patent. The purpose of this projection is to receive, between the forks of the U, a panel, such as a door kickplate.

As shown in FIGS. 1, 2 and 3, the corner gusset generally indicated by the numeral 23 is slidably mounted in the end of the corner element 10. When the corner element 11 is brought into engagement with the corner element 10 along the line 12, the outer corner portion of the gusset 23 is slidably received within the corner element 11. The gusset 23 is tubular or closed-shaped in cross section and includes the spaced apart side walls 24 and 25. The gusset 23 further includes the integral transverse outer wall 34, and the integral inner transverse wall which is connected to the side walls 24 and 25 and which includes the horizontal portion 26, the centrally curved portion 27 and the second horizontal portion 28. As shown in FIG. 3, it will be seen that the curved wall portion 27 includes the extension 29 which abuts the corner element wall 18. The gusset wall portion 29 abuts the inner wall portion 19. The gusset wall portion 27 and the extension 29 coact with the diametrically disposed curved inner wall portion 19 to form an elongated hole or screw channel for engagement by the self-threading screw S. The gusset 23 may be provided with an outwardly extended abutment 30 which limits the inward movement of the gusset 23 into the corner element 10 when the gusset is mounted therein.

As shown in FIGS. 1 and 2, the elongated screw S is adapted to pass through the hole 31 in the outer wall 14 of the corner element 11. The screw S may be provided with a suitable head as indicated by the numeral 32. It will be seen that when the screw S is threaded into the hole formed by the mating corner wall surfaces in the corner element 10 and the gusset 23, that the screw will engage both of these members and as the screw self-threads itself into said curved wall surface, the gusset 23 will be moved to the right as viewed in FIG. 1 until the outer end 33 thereof abuts the inner surface of the wall 14 after which the screw will continue to pass into the channel formed by the said curved wall surfaces.

Experience has shown that the corner joint structure of the present invention provides a rigid and economical joint construction for window frames, door frames or the like. The corner structure of the present invention provides engagement of the screw S on all sides thereof as compared to similar prior art corner structures wherein the screw is only partially enclosed whereby a stronger construction is provided in the structure of the present invention. The corner construction of the present invention eliminates L-shaped gussets which were heretofore used in frame corner constructions whereby a more economical joint structure is provided because of the smaller gusset employed in the invention. A further saving in material with resultant lower costs is effected in the structure of the present invention because of the novel arrangement of a portion of the screw channel being formed in the gusset and that the other portion of the screw channel being formed in one element of the corner construction by the inner surface of an inwardly-projecting elongated wall portion which is normally provided to receive a panel. Thus, the inwardly projecting wall portion is capable of performing the dual functions of engaging the fastener and supporting a panel. The structure of the present invention further prevents caving-in of the outer wall 14 of the one corner element through which the screw S is mounted. Such caving-in which is prevalent in prior art structure is prevented because the outer end 33 of the gusset 23 forms an abutment against the wall 14 to prevent caving-in of the wall 14 when the screw S is threaded into the channel formed by the gusset 23 and the corner element 10. The novel corner construction of the present invention also eliminates any sliding between the mitered ends of the corner elements of a frame construction.

FIG. 4 illustrates a second embodiment of the invention and the corresponding parts are marked with similar reference numerals followed by the small letter "a." FIG. 4 merely illustrates how the invention can be employed with extruded metal channels having a differently curved inner wall. The gusset 23a is provided with a curved wall portion 27a having a U-shaped cross section of front wall 18a, which receives the wall portions 19a, 20a and 22a, which portions define a U-shaped cross section on the corner element 10a, gusset and corner element U-shaped portions cooperating to define a substantially circular screw channel 34 in the same manner as the similar structure shown in FIG. 3. The corner joint structure of FIG. 4 functions in the same manner as the previously described embodiment of FIGS. 1, 2 and 3.

While it will be apparent that the preferred embodiments of the invention herein disclosed are well calulated to fulfill the objects above stated, it will be appreciated that the invention is susceptible to modification, variation and change without departing from the proper scope or fair meaning of the subjoined claims.

What I claim is:

1. In a metallic frame, a corner construction, comprising: a pair of corner elements secured together in angular relationship; a gusset slidably mounted in a first one of said corner elements; and, a fastener means extended through the second one of said corner elements into fastening engagement with said first one of said corner elements and into fastening engagement with said gusset.

2. In a metallic frame, a corner construction, comprising: a pair of corner elements secured together in angular relationship; a gusset slidably mounted in a first one of said corner elements; and, a threaded fastener means extended through the second one of said corner elements and into threaded engagement with said first one of said corner elements and said gusset so as to draw said gusset into abutting engagement with said second one of said corner elements.

3. In a corner construction formed by notching a hollow rectilinear workpiece with a substantially V-shaped notch to define a pair of connected corner elements, inserting a gusset in one of said elements and rotating one of said elements to abut the other element, the combination comprising:
   a pair of connected corner elements, at least one of said elements having an elongated, inwardly projecting wall portion;
   a gusset slidably mounted in said one element and having a longitudinally elongated surface thereon facing said inwardly projecting wall portion to define therewith a substantially enclosed surface for receiving a fastener; and
   a fastener inserted in said other of said corner elements and engaging said longitudinally elongated surface and said inwardly projecting wall portion.

4. The combination according to claim 3 wherein said elongated surface is substantially semi-cylindrical in cross section.

5. The combination according to claim 3 wherein said elongated surface is substantially U-shaped in cross section.

6. The combination according to claim 3 wherein said inwardly projecting wall portion is substantially U-shaped in cross section.

7. In a corner construction formed by notching a hollow rectilinear workpiece with a substantially V-shaped notch to define a pair of connected corner elements, inserting a gusset in one of said elements and rotating one of said elements to abut the other element, one of said elements having an inwardly projecting inner wall portion adjacent the acute angle formed by said elements, the combination comprising:
   a gusset slidably engaging said inner wall portion; and
   a fastener inserted through the other of said elements and engaging said inner wall portion of said one corner element and engaging said gusset.

References Cited by the Examiner

UNITED STATES PATENTS

| | | | |
|---|---|---|---|
| 2,355,679 | 8/44 | Roxs et al. | 85—33 |
| 2,918,153 | 12/59 | Hammitt et al. | 189—46 |
| 2,972,395 | 2/61 | Peremi | 189—36 |
| 3,009,516 | 11/61 | Albee | 160—381 |

FOREIGN PATENTS 846,351  8/60  Great Britain.

HARRISON R. MOSELEY, *Primary Examiner.*